United States Patent

[11] 3,622,114

| [72] | Inventor | Kenneth D. McIntire, Jr.<br>Norwalk, Calif. |
|---|---|---|
| [21] | Appl. No. | 838,059 |
| [22] | Filed | July 1, 1969 |
| [45] | Patented | Nov. 23, 1971 |
| [73] | Assignee | McDonnell Douglas Corporation |

[54] PALLET ASSEMBLY
4 Claims, 3 Drawing Figs.

[52] U.S. Cl............................................................. 248/361 R,
108/51, 108/55, 105/369 A
[51] Int. Cl............................................................. B65d 19/00
[50] Field of Search........................................... 108/51, 55;
248/119, 361 X; 24/239; 105/369 A; 294/67.4 B,
78, 82

[56] References Cited
UNITED STATES PATENTS

| 2,722,970 | 11/1955 | Stechmann | 248/408 X |
| 3,294,034 | 12/1966 | Bodenheimer et al. | 105/369 A X |
| 3,359,607 | 12/1967 | Metz | 24/239 |
| 3,396,678 | 8/1968 | Jensen | 108/51 |
| 3,452,958 | 7/1968 | Hambleton | 108/55 X |
| 3,509,832 | 5/1970 | Daisley, Jr. | 108/51 |
| 3,344,749 | 10/1967 | Bass et al. | 248/361 |
| 3,428,002 | 2/1969 | McIntire, Jr. et al. | 108/51 |

*Primary Examiner*—Bobby R. Gay
*Assistant Examiner*—Peter A. Aschenbrenner
*Attorneys*—Walter J. Jason, Donald L. Royer and Ming Y. Moy

ABSTRACT: A cargo pallet having a center panel and an edge assembly. The edge assembly comprises a plurality of edge members. Each of the edge members has integrally formed therein a plurality of cargo net securing fittings. The entire cargo pallet is fastened together by removable fastening means to permit ease of replacement.

INVENTOR
KENNETH D. McINTIRE JR.

BY Ming Y. Moy
—ATTORNEY—

PALLET ASSEMBLY

BACKGROUND OF THE INVENTION

In the field of cargo transportation, a load supporting device frequently referred to as a pallet is often employed. Generally, a pallet is a substantial planer surface which is employed in a horizontal manner upon which several objects of cargo are fixedly supported. The pallet is especially adapted for retaining the cargo during transportation thereof and it is also designed to make movement of the loaded pallet to and from the primary transportation means as easy as possible. Usually conveyor systems which include low friction rolling devices are used to move the pallet into and out of the primary transportation means.

Common types of primary transportation means are vehicles such as trucks, trains, ships, and aircraft. This invention will be discussed with respect to aircraft although its use in other transportation means is quite probable. In aircraft that are specifically designed for cargo, there are fixed to the floor low frictional devices such as rollers or ball casters. It is not uncommon for a loaded pallet to weigh 10 thousand pounds or more and such weight can cause substantial damage to the pallet during ingress and egress of the pallet or during any shifting movement of the pallet.

Heretofore, the main consideration in the construction of pallets has been strength and durability. Usually the pallet is formed of a central panel of a high impact material. Such a material may be compressed wood or paper fiber which has been chemically treated to increase its durability. To decrease damage to the panel a metallic edge around the panel has usually been employed. Also, a specially machined corner attachment is usually employed which unitarily connects adjacent edge strips. To provide means for attaching cargo net thereto, separate cargo net attachments are usually employed in conjunction with the edge assembly.

To insure that the resultant pallet would be of maximum strength all parts thereof are usually riveted in place. The main disadvantage to the riveting of the sections of the pallet together is that if one part thereof becomes damaged (such as the panel or a portion of the edge) it is difficult to replace and the cost of replacement makes it economically not feasible.

SUMMARY OF THE INVENTION

In carrying out the principles of this invention according to one embodiment thereof, there is provided a cargo pallet having a substantially planer panel and a plurality of edge members fixedly attached to the panel. Each edge member has upper and lower flanges adapted to fit flush with the panel top and bottom surfaces. Each of the edge members has formed therein a generally T-shaped continuous channel having a plurality of spaced enlargements along opposed edges thereof to permit attachment of cargo nets to the pallet.

One of the advantages of the structure of this invention is that any force caused by load movement acting upon the cargo net is distributed throughout the entire pallet evenly without the force being concentrated in any one given place. Since the edge is attached to the panel by removable fastening means such as screws or bolts, portions of the edge or the panel itself, if damaged, may be easily replaced. The specific edge members have been designed to be durable thereby decreasing the possibility of damage. Another advantage is that no special machining is required on any portion of the edge structure thereby permitting interchangeability of all parts and permitting repair in the field without the use of special tools.

DETAILED DESCRIPTION OF THE SHOWN EMBODIMENT

Figure 1:
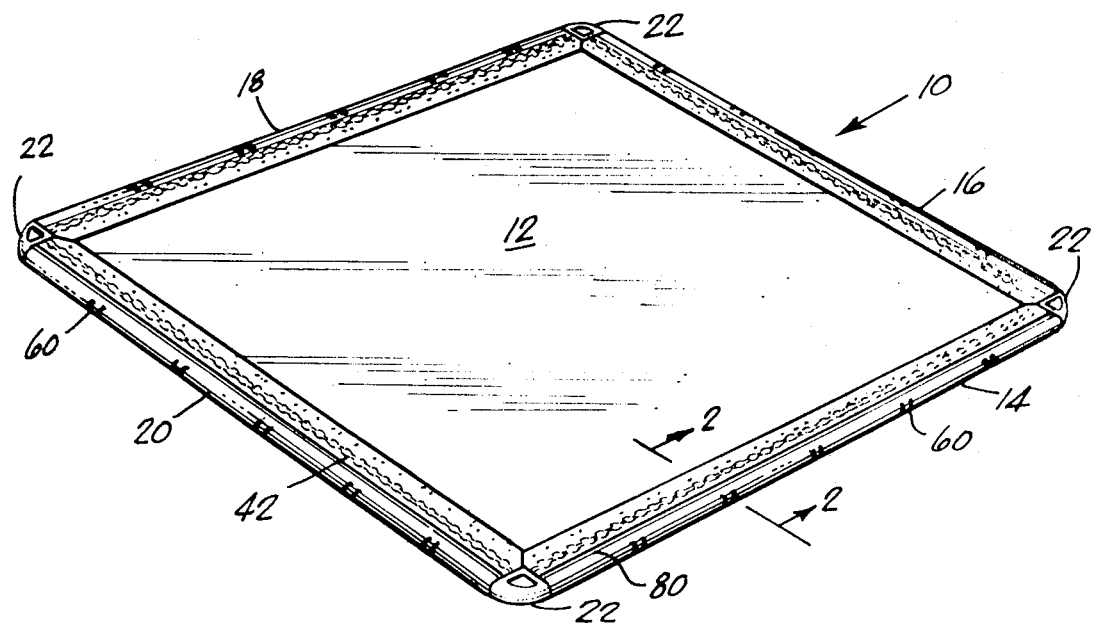
FIG. 1 is a pictoral view of the cargo pallet structure of this invention.
Figure 2:
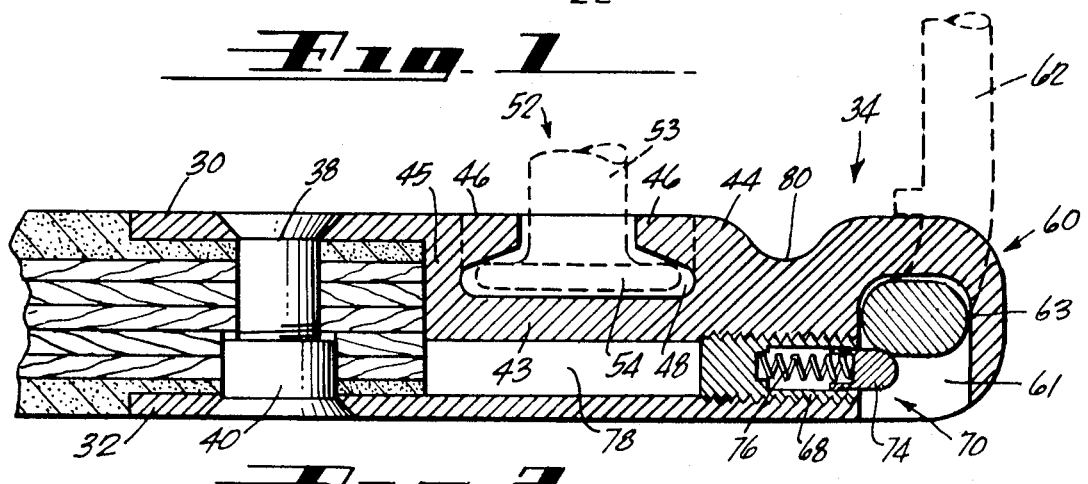
FIG. 2 is an enlarged fragmentary sectional view of the edge structure of the cargo pallet shown in and as taken substantially along line 2—2 of FIG. 1.
Figure 3:
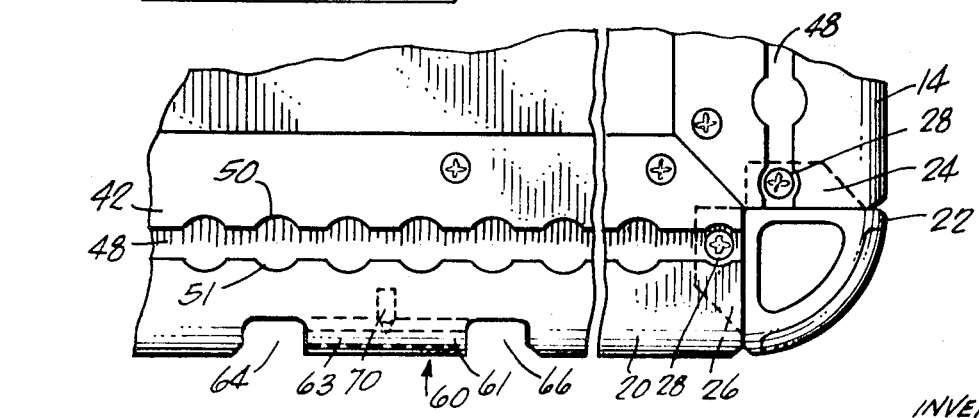
FIG. 3 is a detailed plan view of the corner section of the cargo pallet shown in FIG. 1.

Referring to FIGS. 1 through 3, a pallet structure 10 is shown having a central panel 12 and four edge sections 14, 16, 18 and 20. The panel is usually composed of a material such as wood, compressed wood, compressed paper, metal or laminated synthetic materials. It has been found to be of advantage to have the edge sections composed of a metallic material, however, any material which resists damage and has high strength characteristics would be satisfactory.

Interconnecting the adjacent edge sections 14, 16, 18 and 20 are corner sections 22. Each corner section 22 has a pair of flanges 24 and 26. Flange 24 overlaps with a portion of one edge section (as 14) and the other flange 26 overlaps with the adjacent edge section (as 20). Fastening means 28 are employed through the flanges 24 and 26 and their respective edge sections to hold the corner section 22 in its proper position. Each edge section 14, 16, 18 and 20 is identical in construction and only varies as to their longitudinal length. However, the particular pallet design shown in FIG. 1 is square in shape and therefore the edge sections would be of the same length. In most cases the pallet would be of rectangular shape and therefore edge sections 14 and 18 would be of a slightly longer length than edge sections 16 and 20.

Each edge section includes a base 34 and an upper flange 30 and a lower flange 32 integrally disposed therefrom. The flanges 30 and 32 are separated a distance to permit installation of the edge section flush with the surfaces of the panel 12. More specifically, the flanges 30 and 32 serve to confine a peripheral portion of and having surfaces contiguous with the surfaces of the panel 12. A fastening means such as bolts 38 which cooperate with locking nut 40 securely attaches the upper flange 30 and the lower flange 32 to the panel 12. The spacing between the bolts 38 is a matter of design choice, however, a 3 to 6 inch spacing has been found to be satisfactory.

Formed in the base 34 and located adjacent the upper flange 30 is a generally T-shaped continuous channel 42. The continuous channel 42 is formed by a bottom support 43 and integral longitudinal members 44 and 45. Each of the longitudinal members 44 and 45 has a respective inturned lip portion 46 with the two lip portions 46 defining a longitudinal slot 48. At regular longitudinal intervals (preferably 1 inch) the two lip portions 46 are formed with matching arcuate cutouts 50, with each pair of matching cutouts defining a substantially circular opening 51. The spaced openings or enlargements 51 along the opposed lip portions or edges 46 are provided in the continuous channel 42 to permit attachment of cargo nets to the pallet 10; the cargo nets normally employed over the cargo to maintain all the cargo elements on the pallet during the transportation thereof are usually equipped with a net attachment or similar device 52.

The attachment device 52, as shown in FIG. 2 comprises a vertical leg portion 53 and a circular foot portion 54 to fit into a related slot portion 48. The diameter of the foot portion 54 is slightly smaller than the diameter of circular opening 51, but greater than the minimum distance between the lip portions 46. Thus each foot 54 can be inserted into the opening 51 and turned 90° so that the foot 54 may be lodged within the slot 48 and beneath the lips 46.

The continuous channel 42 provides means for easy attachment of cargo nets. The continuous channel configuration with 1-inch spacing of openings 51 allows the pallet structure of this invention to meet international requirements that the pallet be capable of accepting cargo nets of various configurations and equipped with a device similar to attachment device 52.

In addition to the continuous channel 42, the base element 34 has formed therein along its outer perimeter, a second means 60 for easy attachment of cargo nets. The second fitting means 60 has been designed to facilitate attachment of cargo nets equipped with a stirrup type of attachment device 62. Each of the fitting means 60 is formed by a longitudinal slot 61 through the lower surface of the base element 34. Formed along the perimeter of the base element 34 are cutout portions 64 and 66 which intersect the opposing ends of the slot 61. Thus the slot 61 in combination with the cutout or recessed portions 64 and 66 form a substantially hook-shaped structure 63 which is adapted to receive elements similar to attachment device 62.

As shown in FIGS. 2 and 3, the base element 34 has formed therein adjacent to the slot 61 a cylindrical opening 68 having internal threads to receive a spring plunger 70. The spring plunger 70 provides a resilient means for temporarily retaining the stirrup attachment device 62 within the slot 61. The spring plunger 70 comprises a cylindrical housing, a plunger 74 and a spring 76. The housing has threads of suitable pitch and diameter to mate with the thread inside the opening 68. The plunger 74 has a hemispherical head portion, and a cylindrical body of a diameter of such size as to permit longitudinal movement within the housing. The spring 76 comprises a plurality of coil windings and is provided to continuously urge the plunger 74 to occupy an extended position to retain the attachment device 62 in the recess of the hook-shaped member 62 as shown in FIG. 2.

A continuous slot 78 and a recessed surface 80 have been formed in the base element 34 for the purpose of saving weight, however, such weight saving features have not been incorporated in the pallet design at the expense of durability and structural integrity.

The pallet structure of this invention has the advantage that if a substantial force is created upon the pallet through the cargo net caused by a shifting load or otherwise, this force is distributed throughout the entire pallet. If the pallet receives a shock force on one of the edges, the durable edge assembly is able to absorb all or most of the shock. If damage to the edge does occur, or to one of the corners 22, the damaged section can be easily replaced since all fastening means 28 and 38 are readily removable.

I claim:

1. A cargo pallet comprising:
a substantially planer panel having peripheral edges;
a plurality of edge members;
upper and lower flanges integrally disposed from each of said edge members, said flanges serving to confine a peripheral portion of and having surfaces contiguous with surfaces of said panel;
means for securing said edge members to said panel;
a generally T-shaped, continuous channel formed in at least one surface of each of said edge members, said channel having a plurality of spaced enlargements along opposed edges thereof to permit attachment of other devices to said pallet;
a plurality of substantially hook-shaped extensions integrally disposed from each of said edge members to permit attachment of other devices to said pallet, each of said extensions being formed by a pair of recessed portions formed along the outer perimeter of said edge member and a longitudinal slot intersecting said recessed portions, said longitudinal slot being formed in a surface opposite to the surface having said continuous channel formed therein; and
resilient means secured to each edge member and extending into said longitudinal slots for temporarily retaining the other devices in said longitudinal slots.

2. The cargo pallet of claim 1 wherein:
said means for securing said edge members to said panel comprises removable fastening means whereby upon damage to any portion of said pallet the damaged portion may be easily replaced.

3. The cargo pallet as defined in claim 1 wherein:
said center panel is of a fibrous nonmetallic construction; and
each of said edge members if formed of a single piece of metallic material.

4. The cargo pallet as defined in claim 1 wherein said resilient means include:
at least one spring plunger device adjacent each of said longitudinal slots, said plunger devices being biased to extend a portion thereof into said longitudinal slots for temporarily retaining the other devices therein.

* * * * *